United States Patent
Endo et al.

[11] Patent Number: 4,773,996
[45] Date of Patent: Sep. 27, 1988

[54] APPARATUS FOR DEWATERING PRIMARY DEWATERED SLUDGE PIECES

[75] Inventors: Kazuo Endo; Toshikazu Hanamoto; Shigeru Uchida; Katsuya Kobayashi, all of Kamagaya, Japan

[73] Assignee: Hitachi Metals, Ltd., Tokyo, Japan

[21] Appl. No.: 102

[22] Filed: Jan. 2, 1987

[30] Foreign Application Priority Data

Jan. 14, 1986 [JP] Japan .................................. 61-5808
Jan. 14, 1986 [JP] Japan .................................. 61-5809
Jan. 14, 1986 [JP] Japan .................................. 61-5810

[51] Int. Cl.⁴ ...................... B01D 25/12; B01D 25/30
[52] U.S. Cl. .................................. 210/225; 210/230; 210/231; 100/196
[58] Field of Search ................... 210/224–231; 100/194–206

[56] References Cited

U.S. PATENT DOCUMENTS

| | | | |
|---|---|---|---|
| 3,306,455 | 2/1967 | Fismer | 210/230 |
| 3,695,440 | 10/1972 | Mori | 210/225 |
| 3,981,802 | 9/1976 | Schotten et al. | 210/231 |
| 4,251,373 | 2/1981 | Nakamura | 210/228 |
| 4,267,770 | 5/1981 | Reiner | 100/196 |
| 4,587,022 | 5/1986 | Shimizu et al. | 210/710 |
| 4,591,435 | 5/1986 | Pryadkin et al. | 210/230 |

FOREIGN PATENT DOCUMENTS

| | | | |
|---|---|---|---|
| 0092146A2 | 10/1983 | European Pat. Off. | |
| 2702612 | 7/1977 | Fed. Rep. of Germany | 210/225 |
| 59-209623 | 11/1984 | Japan | 210/230 |
| 59-193792 | 11/1984 | Japan | 210/231 |
| 2035116 | 6/1980 | United Kingdom | 210/225 |

*Primary Examiner*—Richard V. Fisher
*Assistant Examiner*—Richard D. Jordan
*Attorney, Agent, or Firm*—Finnegan, Henderson, Farabow, Garrett & Dunner

[57] ABSTRACT

An apparatus for dewatering primary dewatered sludge pieces conditioned with dewatering powders comprises: a first member having a recess and a path communicating with the recess, a fluid-tight diaphragm mounted over the recess thereby defining a fluid chamber with which the path communicates, a second member having a filtrate member, and a filter member provided over the filtrate chamber. At least one of the first member and the second member is mounted to bring them into fluid-tight contact with each other, and the primary dewatered sludge pieces into a cavity defined by the diaphragm and the filter member. A pressure fluid then is fed to the fluid chamber, thereby isostatically compressing the primary dewatered sludge pieces to remove the water contained therein without substantially destroying the inner structures of the primary dewatered sludge pieces. Because of this isostatic pressure exerted by the diaphragm, the sludge pieces are compressed highly uniformly, resulting in high dewatering efficiency.

15 Claims, 11 Drawing Sheets

APPARATUS FOR DEWATERING PRIMARY DEWATERED SLUDGE PIECES

BACKGROUND OF THE INVENTION

The present invention relates to an apparatus for dewatering sludge, more particularly to an apparatus for dewatering sludge pieces coated with dewatering powders under isostatic pressure.

Sludge is generated by sewage treatment, industrial waste water treatment, etc. in large quantities. Sludge recovered from treatment facilities such as sewage sedimentation ponds usually contain more than 90% by weight of water. Since the sludge is usually dumped or burned, it should be dewatered as much as possible. Particularly in order that it is burned without requiring much fuel, or in order that it is self-burning, the sludge should have a water content of less than about 60 weight %, preferably less than 50 weight %.

Generally, sludge is agglomerated by adding thereto inorganic modifiers such as slaked lime, iron chloride, or organic modifiers such as polymeric agglomerating agents. Agglomerated sludge is then dewatered by a vacuum dehydrator, a centrifugal dehydrator, a belt pres, a filter press, etc., thereby solidifying it. The sludge thus dewatered and solidified may be called "primary dewatered sludge." The primary dewatered sludge usually has a water content of about 70 weight % or more, for instance, about 70–85 weight % particularly when dewatered by a belt press or a filter press, etc.

It was found that pressing the primary dewatered sludge hardly reduces the water content less than 70 weight %. In addition, pressing it under a high pressure is likely to cause the clogging of a filter cloth, unabling further reduction of the water content European Patent Laid-Open No. 0092146A2 discloses a process for dewatering sludge which comprises the steps of disintegrating the primary dewatered sludge to form sludge pieces while preventing the disintegrated sludge pieces from becoming like a slurry, conditioning the disintegrated sludge pieces by coating them with dewatering powders, and compressing the conditioned sludge pieces to force water to ooze out of the sludge pieces, thereby reducing the water content less than 60 weight %.

Figure 16:
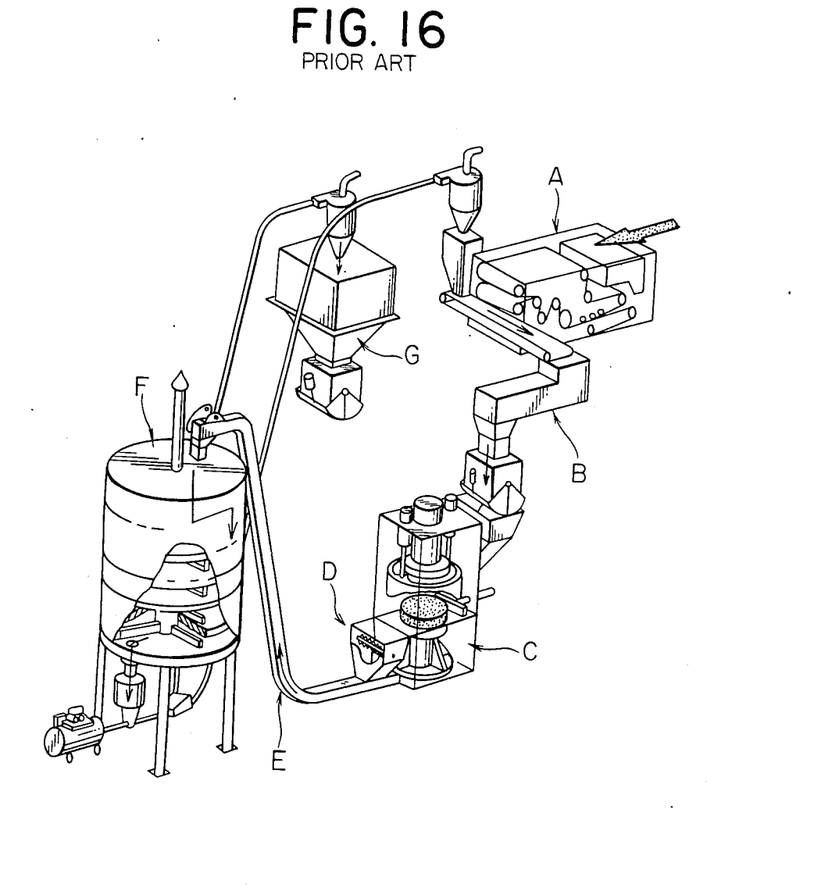
FIG. 16 is a perspective view showing a dewatering system comprising a press for secondary dewatering.

FIG. 16 specifically shows a system for carrying out the process of the above European laid-open application. Mud containing organic materials and having a water content of about 95%, as precipitated on the bottom of a water path, a river, a precipitation pond, etc., is admixed with a polymeric agglomerating agent. The mud precipitated and concentrated by the addition of the agglomerating agent is supplied to a belt press A shown in FIG. 16 and is pressed between filter cloths on the belt press for primary dewatering. A sheet of primary dewatered sludge having a thickness of about 20 mm or less and a water content of about 70–85% is obtained. The primary dewatered sludge then is supplied to a disintegrating machine B, which comprises a rotatable cylindrical drum having small plates or rods projecting from the inner wall thereof and a rotatable shaft having disintegrating blades provided at a lower location in the drum. Dewatering powders are introduced into the disintegrating machine B. The dewatering powders may include incineration ashes which may be provided from a multistage incinerator F. The ashes may be, for instance, about 10–25 weight % of the primary dewatered sludge on a wet basis. The disintegrated sludge is coated with the dewatering powders charged into the disintegrating machine B, which process may be called "conditioning."

The operation time of the disintegrating machine is about 20–40 seconds. However, if continuous disintegration and conditioning are desired, the disintegrating machine is constructed such that it is charged with them continuously and retains them for about 20–40 seconds, during which the disintegration and conditioning take place simultaneously. The thus conditioned sludge are such that at least about 70% by weight thereof have a size of about 10 mm or less and their surfaces are substantially coated with incineration ashes. They are not substantially kneaded so that their inner structures are not substantially destroyed.

The conditioned sludge pieces thus prepared in the disintegrating machine B are then supplied to a press C. The press C has a ram connected to a piston of a hydraulic cylinder for compressing the sludge by moving the piston downwardly. A thick, perforated plate having a large number of pores is provided on the bed of the press, and a filter cloth is laid on the bed. The conditioned sludge pieces are placed on the filter cloth. A thick perforated plate is mounted on the lower end of the ram, and a filter cloth is provided on the lower side of the perforated plate. A batch of the conditioned sludge pieces is compressed between the press bed and the ram in the press C. A filtrate produced by the compression is sucked out by a vacuum pump through the pores of the upper and lower perforated plates.

Next, the disc-shaped sludge is disintegrated in a disintegrator D, and then is introduced into a multistage sludge incinerator F through a conveyor E. A portion of ashes produced by burning the sludge in the incinerator F may be supplied to the disintegrating machine B through a pneumatic pipe. The remainder of the ashes is stored in an ash hopper G for subsequent disposal.

It has been found, however, that the pressing of the primary dewatered sludge pieces conditioned with dry dewatering powders for further dewatering is not always effective as a secondary dewatering step, because the sludge pieces poured into the press C tend to have an uneven top surface, making it likely to be compressed ununiformly. Specifically speaking, the sludge pieces are usually charged ununiformly in the press and the bottom surface of the ram is flat, so that uneven pressure is applied to the sludge pieces contained in the press from position to position. In addition, the sludge pieces subjected to higher pressure too quickly are less likely to enjoy efficient dewatering because their inner structures are destroyed as mentioned later, so that the total dewatering efficiency rather decreases. It has also been found that such phenomenon is peculiar to sludge pieces which retain water paths or capillaries in their inner structures.

OBJECT AND SUMMARY OF THE INVENTION

An object of the present invention is, therefore, to provide an apparatus for dewatering the primary dewatered sludge pieces conditioned with dewatering powders.

More particularly, an object of the present invention is to provide an apparatus for dewatering the primary dewatered sludge pieces conditioned with dewatering powders under isostatic pressure without causing uneven compression of the sludge pieces.

The apparatus for dewatering primary dewatered sludge pieces conditioned with dewatering powders according to the present invention comprises a first member having a recess and a path communicating with the recess; a fluid-tight diaphragm mounted in the recess thereby defining a fluid chamber with which the path communicates; a second member having a filtrate chamber; a filter member provided on the filtrate chamber; means for moving at least one of the first and second members to bring them into fluid-tight contact with each other; means for introducing the primary dewatered sludge pieces into a cavity defined by the diaphragm and the filter member, and means connected to the path of the first member for supplying a pressure fluid to the fluid chamber thereby isostatically compressing the sludge pieces to remove the water contained therein without destroying the inner structures of the sludge pieces.

DESCRIPTION OF THE PREFERRED EMBODIMENTS

To fully understand the features of the dewatering apparatus according to the present invention, the nature of sludge to be treated will be explained first.

Figure 1:
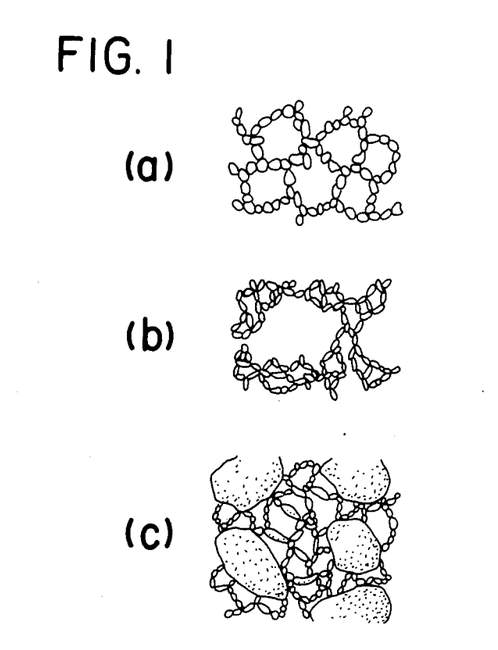
FIGS. 1(a)-1(c) are views showing typical examples of sludge particles bonded to each other.
Figure 2:
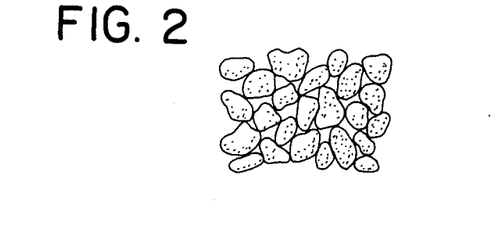
FIG. 2 is a view showing sludge particles in a slurry-like sludge.

Sludge to be dewatered according to the present invention is composed mainly of rotten organic materials and colloids suspended in drainage from homes, factories, chicken farms, pig farms, etc. It is sedimented and collected by an aeration method, a screen method, etc. The collected sludge is first subjected to primary dewatering by means of a filter press, a belt press, etc. The primary dewatered sludge contains about 70 weight % or more of water. The primary dewatered sludge has a microstructure as exemplified by FIGS. 1(a)-(c). It is noted that the microstructure of the primary dewatered sludge is composed of fine sludge particles weakly bonded to each other, leaving small gaps or spaces therebetween. Adjacent gaps or spaces are connected with each other, forming fine paths for permitting the water to flow. Such fine water paths may be called "capillaries." Because the bonding of sludge particles is relatively weak, vibration, stirring or kneading would turn the primary dewatered sludge like a slurry in which the fine water paths or capillaries are destroyed as shown in FIG. 2. Once turned into a slurry, the capillaries cannot be re-created and no further dewatering can be achieved by compression even under extremely high pressure.

When the primary dewatered sludge is compressed without destroying its microstructure, namely without vibrating, stirring or kneading it, the bonding structure of sludge particles is deformed, making the water paths narrower. As a result, the water retained in the fine water paths must be squeezed out. What should be noted in this case is the facts that the water retained in the fine water paths is less mobile, and that time necessary for dewatering is proportional to a square of the length of a fine water path or capillary through which the water is squeezed out. In other words, when the thickness of the primary dewatered sludge is doubled, the dewatering time becomes four times. Accordingly, the primary dewatered sludge is disintegrated into small pieces to reduce the distance which the water has to travel to be removed from the sludge. On the other hand, in dewatering powders composed of dry incineration ashes, diatomaceous earth powders, gypsum powders, calcium carbonate powders, coal powders, bone meal powders, dried pulp powders, sawdust, dry soil powders, etc., the water is extremely mobile, about $10^3$-$10^4$ times more mobile than in the primary dewatered sludge.

Therefore, when the primary dewatered sludge disintegrated into small pieces is coated with the dewatering powders such as dry incineration ashes, the time required for dewatering is greatly reduced, because the water which has reached the surface of each sludge piece can rapidly be removed through the dewatering powder layer. As is clear from the above, the dewatering time for the primary dewatered sludge pieces conditioned with the dewatering powders is mostly determined by the time for the water to reach the surfaces of the sludge pieces, and once the fine water paths or capillaries are destroyed, dewatering is substantially no longer possible by compression.

For high dewatering efficiency, the primary dewatered sludge pieces are preferably 1-20 mm in size and coated with 10–50 weight % of the dewatering powders on a wet basis.

The dewatering apparatus according to the present invention is designed for dewatering such primary dewatered sludge pieces.

Figure 3:
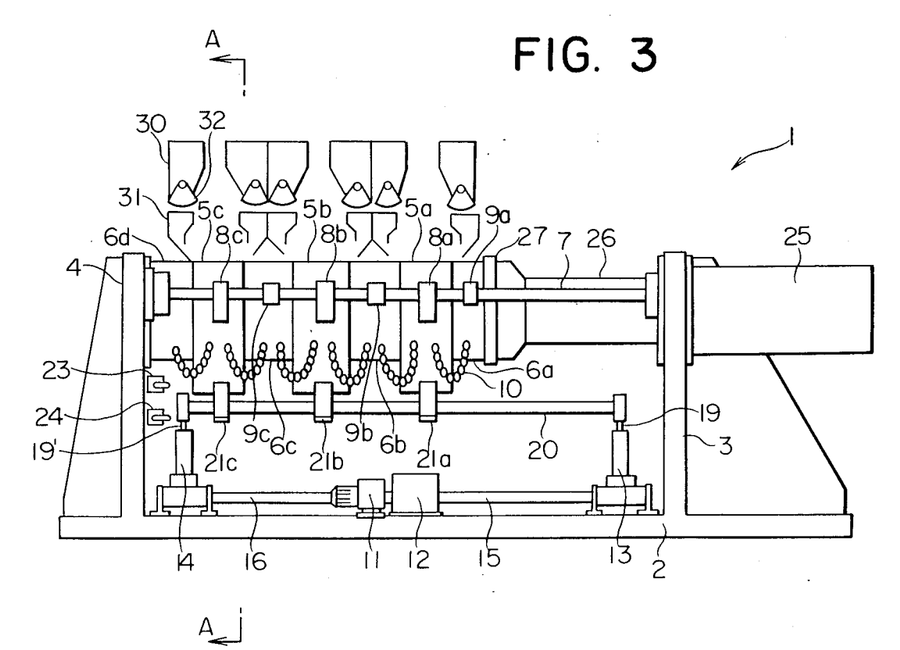
FIG. 3 is a schematic view showing the overall structure of the dewatering apparatus according to one embodiment of the present invention.
Figure 4:
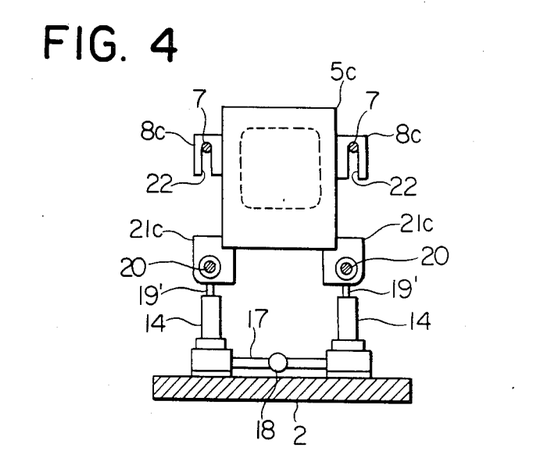
FIG. 4 is a cross-sectional view taken along the line A—A in FIG. 3.

FIG. 3 shows a dewatering apparatus according to one embodiment of the present invention. The dewatering apparatus 1 has a bottom frame 2, a right vertical frame 3 secured to the bottom frame 2, and a left vertical frame 4 secured to the bottom frame 2. Provided between the right and left vertical frames 3, 4 are a plurality of compression plates 5a, 5b, 5c (first members) and a plurality of filtration plates 6a, 6b, 6c, 6d (second members) arranged alternately. As shown in FIG. 4, a pair of guide rods 7, 7 extend between the right and left vertical frames 3, 4 and fixed thereto. Each of the compression plates 5a, 5b, 5c is provided with a pair of guide members 8a, 8b, 8c which are slidable along the guide rods 7, 7, and each of the filtration plates 6a, 6b, 6c is provided with a pair of guide members 9a, 9b, 9c which are also slidable along the guide rods 7, 7. The leftmost filtration plate 6d is secured to the left frame 4. Each pair of adjacent compression plate and filtration plate are connected by a chain 10.

Mounted on the bottom frame 2 is a motor 11, a gear box 12 and a pair of front vertical cylinders 13, 13 and a pair of rear vertical cylinders 14, 14. A rotatable shaft 15 extends from the gear box 12 longitudinally, namely in parallel with the guide rod 7, and a rotatable shaft 16 extends from the motor 11 in parallel with the guide rod 7. A pair of rotatable shafts (not shown) extending in perpendicular to the shaft 15 are connected with the shaft 15 via a bevel gear (not shown). Likewise, a pair of rotatable shafts 17 extending in perpendicular to the shaft 16 are connected with the shaft 16 via a bevel gear 18. Each vertical cylinder 13, 14 has a vertical rod 19, 19', each of which is fixed to each end of a pair of horizontal guide rods 20, 20. This is better shown in FIG. 4. Guide members 21a, 21a; 21b, 21b; 21c, 21c mounted on both lower sides of the compression plates 5a, 5b, 5c slidably engage a pair of guide rods 20, 20.

As is clearly shown in FIG. 4, the guide members 8a, 8a; 8b, 8b; 8c, 8c secured to both sides of the compression plates 5a, 5b, 5c have vertical recesses 22, 22 each extending longitudinally (in parallel with the guide rod 7) and having an opening at the bottom. Because of this structure, the recesses 22, 22 enable the compression plates 5a, 5b, 5c to slide along the guide rods 7, 7 as well as to move up and down at any position along the guide rods 7, 7. Since four vertical cylinders 13, 13, 14, 14 positioned at the corners of the bottom frame 2 move their vertical rods 19, 19, 19', 19' up and down synchronously, the compression plates 5a, 5b, 5c also move up and down synchronously. An upper limit switch 23, and a lower limit switch 24 mounted on the left vertical frame 4 serve to restrict the range in which the guide rods 20, 20 move up and down.

A hydraulic cylinder 25 is mounted on the right vertical frame 3, and its piston rod 26 moves back and forth in parallel with the guide rods 7, 7. A top end of the piston rod 26 is fixed to a connecting plate 27 which is in turn fixed to the filtration plate 6a. When the piston rod 26 retracts, the filtration plate 6a is moved rightwardly, and the compression plate 5a adjacent to the filtration plate 6a is also moved rightwardly because they are connected by a chain 10. Since each adjacent pair of the filtration plates and the compression plates are connected by chains 10, all of them are moved rightwardly except for the leftmost filtration plate 6d which is fixed to the left frame 4, leaving a gap determined by the length of each chain 10 between each adjacent pair.

Provided above these compression plates and filtration plates are plural pairs of sludge hoppers 30 and chutes 31. Each sludge hopper 30 has a hopper gate 32 which serves to supply a constant amount of sludge pieces to the underlying chute 31, thus providing means for introducing primary deviated sludge pieces into each cavity defined between the adjacent compression plate and filtration plate as described in full detail later.

Figure 5:
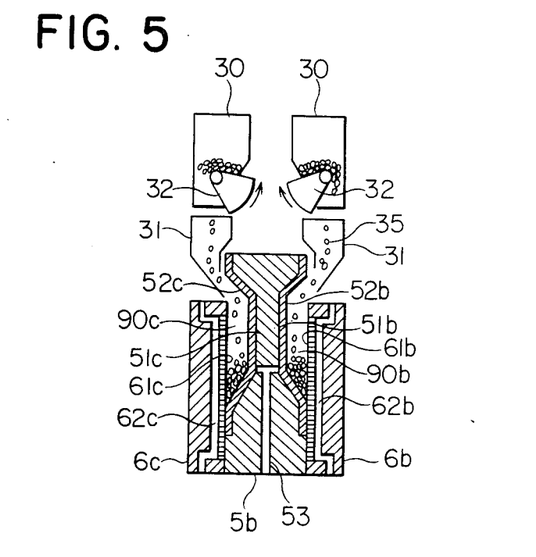
FIG. 5 is a schematic, cross-sectional view of an essential portion of the dewatering apparatus of FIG. 3.

FIG. 5 schematically shows the structures of the compression plate and the filtration plate. It should be noted that FIG. 5 shows only a part of the overall apparatus, and that the other compression plates and filtration plates have the same structure and move in the same manner.

The compression plate 5b has a recess 51b, 51c on each side, and a diaphragm 52b, 52c is mounted on the rim of each recess 51b, 51c in a fluid-tight manner with its middle portion received in the recess 51b, 51c. A fluid path 53 extending in the compression plate 5b is open to each recess 51b, 51c. Each of adjacent filtration plates 6b, 6c has a filter member 61b, 61c and a filtrate chamber 62b, 62c. When the recess 51b, 51c faces the filter member 61b, 61c, a cavity 90b, 90c is defined thereby.

The operation of this dewatering apparatus will be explained below.

First, the piston rod 26 projects to make narrow a gap between each pair of the compression plates 5a, 5b, 5c and the filtration plates 6a, 6b, 6c, 6d. The motor 11 drives four vertical cylinders 13, 13, 14, 14 via shafts 15, 16 so that the vertical rods 19, 19, 19', 19' project synchronously to the highest position controlled by the upper limit switch 23, whereby the compression plates 5a, 5b, 5c connected to the guide rod 20, 20 via guide members 21a, 21b, 21c are elevated to the highest position as shown in FIG. 5. At this highest position, the hopper gate 32 of each sludge hopper 30 is rotated to permit a predetermined amount of the conditioned sludge pieces 35 contained in each hopper 30 to fall through each chute 31 into a cavity defined by each adjacent pair of the diaphragms and the filter members. As a result, the cavity is substantially filled with the predetermined amount of the conditioned sludge pieces 35. It should be noted that although the sludge pieces 35 conditioned with dewatering powders such as incineration ashes fall from the hopper 30 through the chute 31 into the cavity 90, they are not subjected to so much vibration or impact that their inner structures, namely their capillaries are not substantially destroyed.

The compression plates 5a, 5b, 5c are then lowered to the position controlled by the lower limit switch 24 at which each diaphragm 52 and each filter member 61 face each other. The piston rod 26 then projects a little further so that each cavity defined by the adjacent compression plate and filtration plate is completely sealed in a fluid-tight manner.

Figure 6:
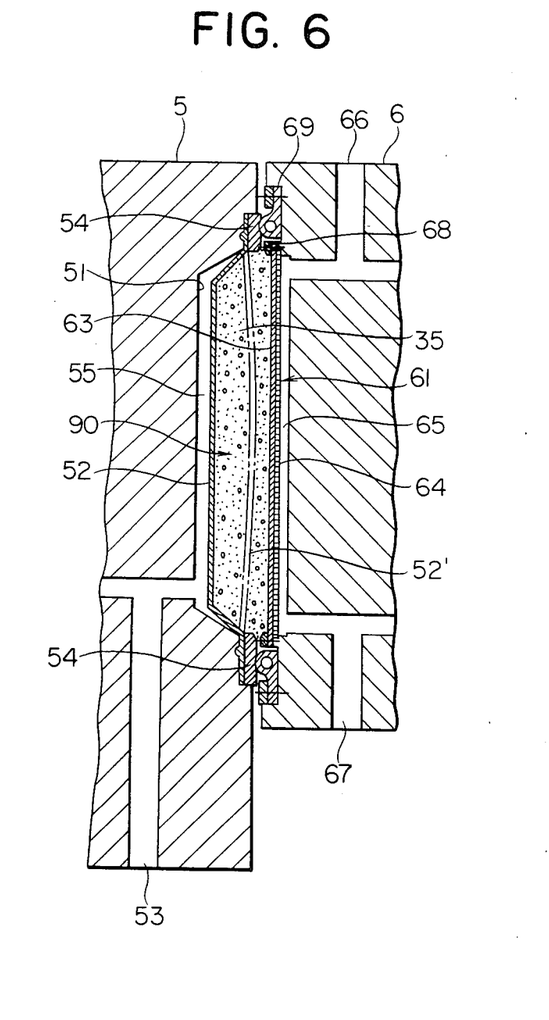
FIG. 6 is an enlarged, cross-sectional view of an essential portion of FIG. 5.

FIG. 6 shows the details of the sealed cavity 90 containing the conditioned sludge pieces 35. I should be noted that FIG. 6 merely represents one of the same cavities defined by the adjacent pairs of compression plates and filtration plates.

The compression plate 5 has a recess 51, a fluid path 53 communicating with the recess 51, and a diaphragm 52 whose circumference is secured to the rim of the recess 51 with a number of screws (not shown) and an annular fixing plate 54. Defined between the recess 51 and the diagram 52 is a fluid chamber 55 into which a pressure fluid such as pressurized water is supplied through the path 53 to push the diaphragm 52 toward the conditioned sludge pieces 35 as explained in detail below. The diaphragm 52 should be fully elastic so that it can exert uniform pressure on every part of the sludge pieces 35 contained in the cavity 90. For this purpose, the diaphragm 52 is preferably made of rubber, natural or synthetic.

The filtration plate 6 has a filter member 61 consisting of a filter cloth 63 and a porous support plate such as a grating 64, and a filtrate chamber 65 facing the porous support plate 64. An inlet 66 and an outlet 67 are communicating with the filtrate chamber 65 so that a pressurized air can flow through the filtrate chamber 65, or so that an air flow is caused by sucking from the outlet 67. The porous support plate 64 is securely fixed to the filtration plate 6, and the filter cloth 63 is fixed onto the support plate 64 with an annular fixing plate 68 fastened to the filtration plate 6 with a number of screws (not shown). An annular seal member 69 is provided to completely seal the gap between the annular fixing plates 54 and 68.

After the compression plate 5 and the filtration plate 6 are brought into fluid-tight contact with each other with a predetermined amount of the conditioned sludge pieces 35 contained in the cavity 90 defined by the diaphragm 52 and the filter cloth 63, a pressure fluid such as pressurized water is supplied into the fluid chamber 55 via the path 53. It is an important feature that fluid pressure mounting in the fluid chamber 55 exerts through the diaphragm 52 isostatic pressure namely uniform pressure on the conditioned sludge pieces 35 contained in the cavity 90. Compression under this isostatic pressure serves to squeeze the water out of the conditioned sludge pieces 35 without causing uneven dewatering to take place in the sludge pieces 35. In other words, uniform compression of the sludge pieces under isostatic pressure can provide higher percentage of dewatering than the conventional pressing.

Figure 7:
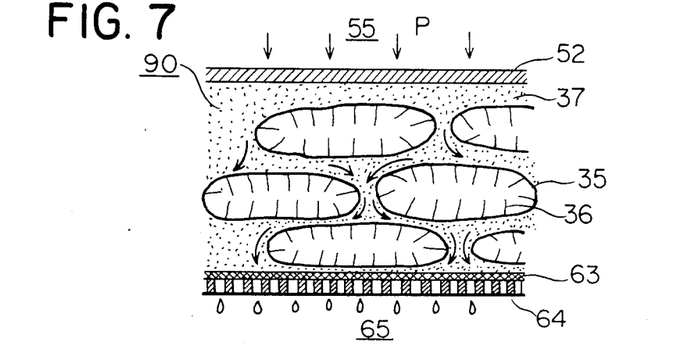
FIG. 7 is an enlarged view schematically showing the dewatering of conditioned sludge pieces under isostatic pressure.

FIG. 7 schematically shows the details of the conditioned sludge pieces under isostatic pressure. Each sludge piece 35 has innumerable capillaries 36 which serve as paths for water to flow from the inside to the surface. As long as the sludge pieces' inner structures, namely their capillaries 36 remain substantially undestroyed, the water continues oozing out of the sludge pieces 35 under increasing pressure. The time period for the water to flow in a capillary is proportional to the square of its length. In this sense, the finer the sludge pieces, the faster the water can be squeezed out. On the other hand, the disintegration of the primary dewatered sludge into excessively small pieces while coating them with dry dewatering powders such as incineration ashes might lead to substantial vibration and kneading of the sludge, at the same time making it difficult to carry out such operation. Accordingly, the sludge pieces preferably have an average size of 1-20 mm, more preferably 5-10 mm.

Since each sludge piece 35 is conditioned with dewatering powders, there is a powder phase 37 among the sludge pieces 35 in the cavity 90 defined by the diaphragm 52 and the filter cloth 63. It is to be noted that once the water reaches the surface of each sludge piece 35, it flows in the dewatering powder phase 37 about $10^3$–$10^4$ times as fast as in the sludge. Therefore, the time necessary for the water to flow in the powder phase 37 is almost negligible in the overall dewatering time, even though the filter cloth 63 is provided only one side of the cavity 90 and the cavity 90 is relatively thick.

It is an important feature of the present invention that fluid pressure P in the fluid chamber 55 pushes the diaphragm 52 uniformly, which in turn exerts uniform (isostatic) pressure on the sludge pieces 35 without substantially destroying the capillary structures of the sludge pieces 35. On the other hand, if there is substantial unevenness in pressure like in the pressing of conditioned sludge pieces, uneven dewatering would take place, resulting in a lower dewatering rate as a whole.

In order to increase the dewatering efficiency, in other words, to shorten the dewatering time, a two-step compression is desirable. First, the conditioned sludge pieces are compressed under small isostatic pressure of 10-25 kg/cm$^2$ for 30-120 seconds. The preferred pressure and compression time are 15-20 kg/cm$^2$ and 30-90 seconds, respectively, in the first step. In a second step, the sludge pieces are further compressed under higher isostatic pressure of 30-70 kg/cm$^2$ for 60-240 seconds. The preferred pressure and compression time are 40-50 kg/cm$^2$ and 60-180 seconds, respectively, in the second step. This two-step compression is particularly effective because quick compression under high pressure from the beginning is highly likely to destroy the inner structures of the sludge pieces, making the water contained therein less mobile, and because once the water flow in the capillaries of the sludge pieces is established by compression under low pressure, much higher pressure simply accelerates the water flow without substantially destroying the capillaries.

Returning to FIG. 6, the filtrate chamber 65 serves to collect the water squeeze from the sludge pieces 35. In order to enhance the dewatering efficiency, a pressurized air is blown into the inlet 66, entraining water droplets emerging to the surface of the porous support member 64 through the filter cloth 63 and withdrawing them from the outlet 67. The same function can be achieved by sucking the air from the outlet 67. When the dewatering is completed, the diaphragm 52 reaches the position shown by phantom lines 52' in FIG. 6.

This dewatering process is called herein "secondary dewatering," and the sludge pieces dewatered in this secondary dewatering process is called herein "secondary dewatered sludge."

After completion of the compression, the piston rod 26 retracts, moving rightwardly the compression plates 5a, 5b, 5c and the filtration plates 6a, 6b, 6c connected with each other by the chains 10. When the gap between the adjacent compression plate and filtration plate becomes fully wide, the secondary dewatered sludge falls from the cavity 90 onto a withdrawal conveyor belt (not shown). The resulting secondary dewatered sludge contains less than 60 weight % of water, and its water content reaches as small as about 30 weight % under proper compression conditions.

Figure 8:
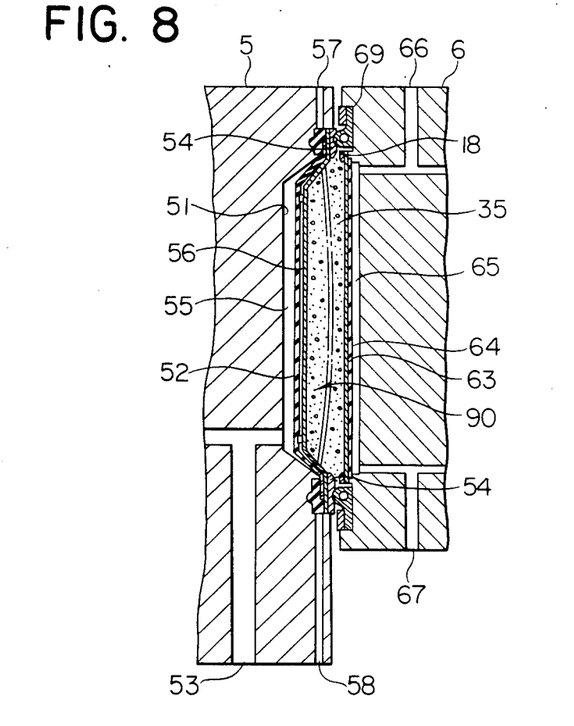
FIG. 8 is an enlarged, cross-sectional view showing an essential portion of the dewatering apparatus according to another embodiment of the present invention.

FIG. 8 shows the details of another embodiment of the present invention. In this embodiment, a second filter cloth 56 is provided inside the diaphragm 52 with gap therebetween. This gap is ensured by a number of projections or grooves on the inner surface of the diaphragm 52. An inlet 57 and an outlet 58 are communicating with the gap between the diaphragm 52 and the second filter cloth 56 to permit a pressurized air to flow therethrough so that the water squeezed and filtered through the second filter cloth 56 can be entrained by the air flow. This structure further increases the dewatering efficiency. With respect to the remaining parts, there is no difference from the embodiment of FIG. 6. Therefore, the same numbers are used in FIG. 8 as in FIG. 6.

Figure 9:
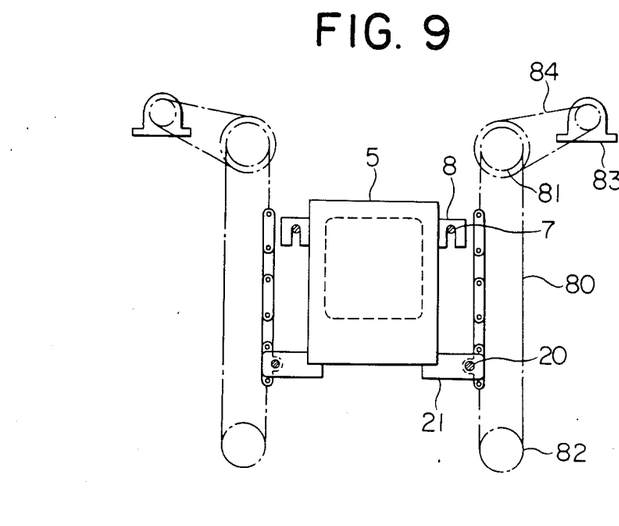
FIG. 9 is a schematic view showing the compression plate-moving mechanism according to a further embodiment of the present invention.

FIG. 9 schematically shows a compression plate-moving mechanism according to a further embodiment of the present invention. Since everything is symmetric in FIG. 9, only a right part of the mechanism will be explained below. A compression plate 5 is provided with an upper guide member 8 and a lower guide member 21. The upper guide member 8 detachably engages a horizontal guide rod 7 so that the compression plate 5 can slide horizontally along the guide rod 7 and at the same time can move up and down at any position along the guide rod 7. An endless chain 80 is provided around an upper pulley 81 and a lower pulley 82, and a horizontal guide rod 20 is slidably mounted to one chain element of the chain 80. The guide rod 20 also slidably engages the lower guide member 21. The upper pulley is rotated by a motor 83 via an endless belt 84.

Figure 10:
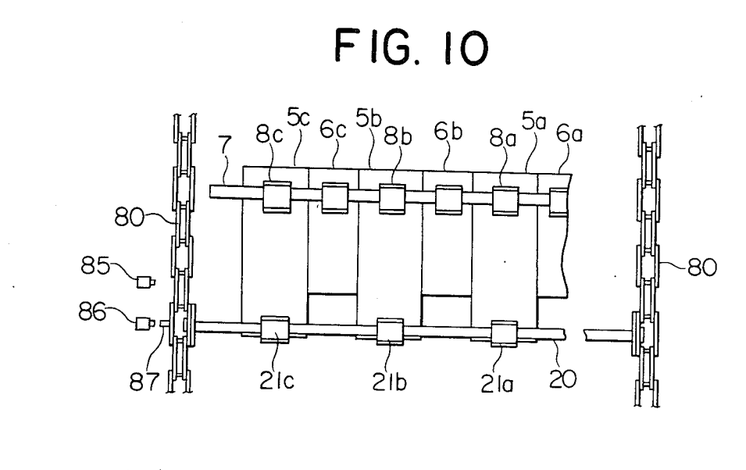
FIG. 10 is a partial, schematic view showing the dewatering apparatus comprising the compression plate-moving mechanism of FIG. 9.

FIG. 10 is a partial, schematic, side view of a dewatering apparatus comprising the compression plate-moving mechanism as shown in FIG. 9. Except for the compression plate-moving mechanism, the dewatering apparatus of FIG. 10 is essentially the same as that of FIG. 3. Therefore, explanation will be omitted for the same members. In this mechanism, the vertical movement of a plurality of compression plates 5a, 5b, 5c is achieved by moving the chains 80, 80 supporting the guide rod 20 up and down. The upper and lower limits of the chain movement are determined by an upper limit switch 85 and a lower limit switch 86 each engageable with a detector 87 fixed to one of the chains 80.

Figure 11:
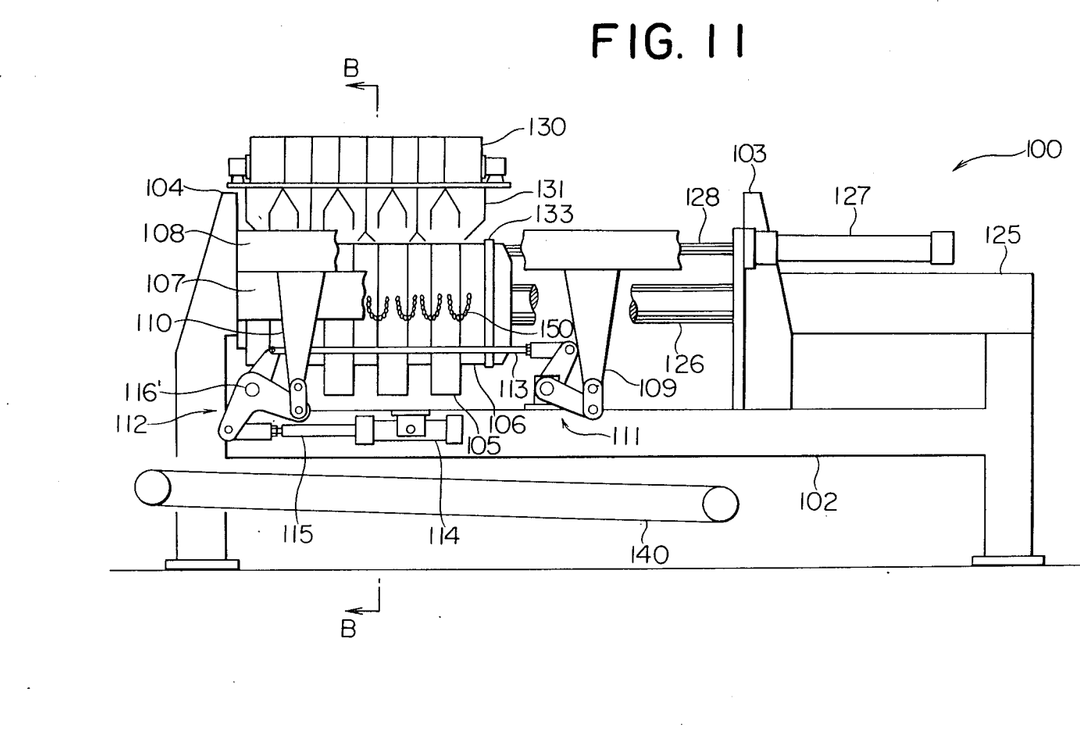
FIG. 11 is a schematic view showing the overall structure of the dewatering apparatus according to a still further embodiment of the present invention.

FIG. 11 shows another embodiment of the present invention. This dewatering apparatus 100 has a lower frame 102, a right vertical frame 103 secured to the lower frame 102, and a left vertical frame 104 secured to the lower frame 102. Provided between the right and left vertical frames 103, 104 are a plurality of compression plates 105 (first members) and a plurality of filtration plates 106 (second members) arranged alternately. A pair of stationary guide frames 107 extend longitudinally on both sides between the right and left vertical frames 103, 104 and fixed thereto. Provided above the guide frames 107 are a pair of guide rail means 108 which are movable up and down by a pair of links 109, 110 on each side. The link 109 is connected to a link mechanism 111 which is in turn connected to a link mechanism 112 via a connecting rod 113. The link 110 is connected directly to the link mechanism 112 which is in turn connected to a hydraulic cylinder 114 via a connecting rod 115. It should be noted that a central pin 116' of the link mechanism 112 is fixed to a shaft 116 extending transversely between a pair of the link mechanisms 112 as clearly shown in FIG. 12. The shaft 116 is rotatably supported by a pair of bearings 117 which are fixed to the lower frames 102. According to this link system, a pair of guide rail means 108 are movable up and down synchronously with each other by driving the hydraulic cylinder 114.

Figure 12:
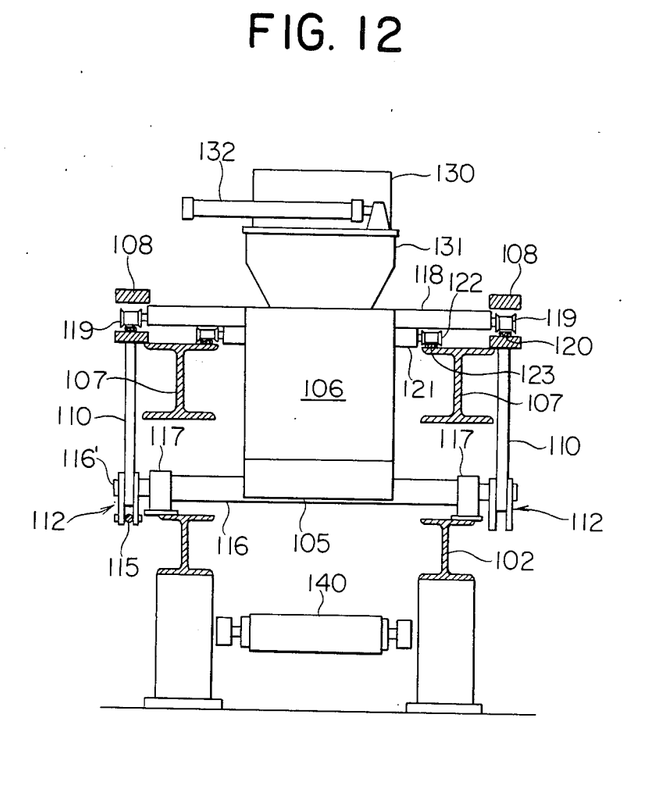
FIG. 12 is a cross-sectional view taken along the line B—B in FIG. 11.

Referring to FIG. 12, each compression plate 105 is equipped at its upper end with a long shaft 118 extending transversely, and both ends of the long shaft 118 are provided with guide rolls 119 adapted to move back and forth along guide rails 120 mounted on the guide rail means 108 And each filtration plate 106 is equipped at its upper end with a short shaft 121 extending transversely, and both ends of the short shaft 121 are provided with guide rolls 122 adapted to move back and forth along guide rails 123 mounted on the stationary guide frames 107.

Returning to FIG. 11, fixed to the right vertical frame 103 are a main cylinder 125 having a piston rod 126 and an auxiliary cylinder 127 positioned above the main cylinder 125 and having a piston rod 128. Both of the piston rods 126, 128 are directly connected to a connecting plate 133, so that the piston rod 128 of the auxiliary cylinder 127 can cause the piston rod 126 to move back and forth. The main cylinder 125 serves to seal the gaps between the compression plates 105 and the filtration plates 106 in a fluid-tight manner, but its piston rod 126 moves relatively slowly. On the other hand, the auxiliary cylinder 127 can move the piston rod 128 faster, though its compression force is relatively small. Therefore, the auxiliary cylinder 127 is used for pushing or pulling the connecting plate 133 fixed to the rightmost filtration plate 106 at a higher speed.

Provided above these compression plates 105 and filtration plates 106 are plural pairs of sludge hoppers 130 and chutes 131. Each sludge hopper 130 has a hopper gate 132 which serves to supply a predetermined amount of sludge pieces to the underlying chute 131, which in turn charges the sludge pieces into a gap between the adjacent compression plate 105 and the filtration plate 106.

A belt conveyor 140 is provided below the compression plates 105 and the filtration plates 106 for receiving the secondary dewatered sludge which falls from the gaps therebetween.

The dewatering apparatus of FIG. 11 may be operated similarly to that of FIG. 3. That is, first, the piston rod 128 of the auxiliary cylinder 127 are fully retracted so that the compression plates 105 and the filtration plates 106 are separated, providing a gap determined by the length of the chain 150 between each adjacent pair. Because both ends of each chain 150 are held in vertical grooves, the compression plates 105 can move upward when the chains 150 are tensioned. The hydraulic cylinder 114 is driven to move a pair of guide rail means 108, 108 upward via four link mechanisms 111, 111, 112, 112 and four links 109, 109, 110, 110 and the piston rod 128 projects to loosely close each gap, so that a cavity defined by each adjacent compression plate 105 and filtration plate 106 is vertically wide open at the top of each filtration plate 106. At this position, the hopper gate 132 of each sludge hopper 130 is rotated to permit a predetermined amount of the conditioned sludge pieces contained in each hopper 130 to fall through chute 131 into the above cavity. As a result, the cavity is substantially filled with the predetermined amount of the sludge pieces. In this case too, the sludge pieces conditioned with dewatering powders such as incineration ashes falling from the hopper 130 through the chute 131 into the cavity are not subjected to substantial vibration or impact so that their inner structures, namely their capillaries are not substantially destroyed.

The compression plates 105 are then lowered to the position controlled by a lower limit switch (not shown) at which each adjacent pair of a diaphragm and a filter member face each other. The piston rod 126 of the main cylinder 125 then presses the connecting member 133 so that each gap between each adjacent pair of the compression plate 105 and the filtration plate 106 is completely closed fluid-tightly.

The diaphragms of the compression plate 105 and the filter members of the filtration plate 106 may be substantially the same as those shown in FIG. 6. After completing the dewatering of the conditioned sludge pieces contained in each cavity, the piston rod 128 retracts to open the gaps between the adjacent compression plates and filtration plates. As a result, the sludge thus dewatered (secondary dewatered sludge) falls onto the conveyor belt 140 which carries it to a sludge collecting port (not shown).

Figure 13:
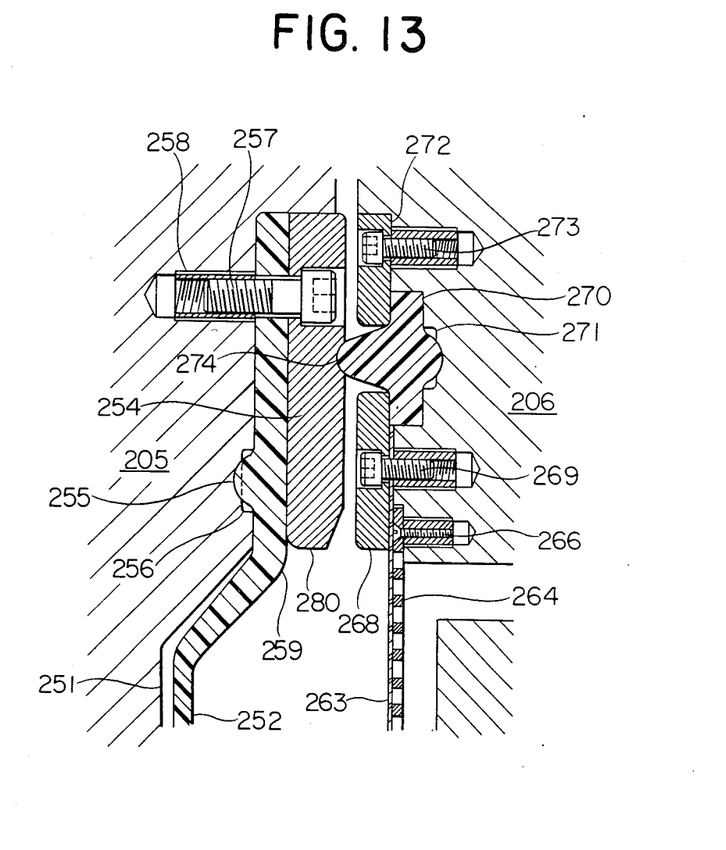
FIG. 13 is an enlarged, cross-sectional view showing the sealing mechanism of a diaphragm and a filter member according to one embodiment of the present invention.

FIG. 13 shows the details of a sealing structure according to a further embodiment of the present invention.

A compression plate 205 has a central recess 251 sealed with a diaphragm 252 around the periphery thereof. The diaphragm 252 has an annular projection 255 on the peripheral inner side thereof, and the annular projection 255 is adapted to be deformed under pressure into an annular recess 256 of the compression plate 205 provided around the periphery of the central recess 251. An annular fixing plate 254 is fixed to the compression plate 205 via the diaphragm 252 with a number of screws 257 so that fluid-tight sealing is established between the compression plate 205 and the diaphragm 252. When the compression plate 205 is made of a synthetic resin to reduce its weight, a cylindrical bush 258 is embedded in the compression plate 205 for securing the screw 257 thereto.

With respect to a filtration plate 206, a porous support plate such as a grating 264 is fixed to the filtration plate 206 with a number of screws 266, and a filter cloth 263 is fastened to the filtration plate 206 with an annular fixing plate 268 and a number of screws 269. An elastic, annular seal member 270 is recieved in an annular recess 271 and fixed to the filtration plate 206 with the annular fixing plate 268 and another annular fixing plate 272 which is also secured to the filtration plate 206 with a number of screws 273. The elastic, annular seal member 270 has an annular projection 274 which is elastically deformed by the opposing fixing plate 254, ensuring fluid-tight sealing therebetween.

Since the diaphragm 252 is deformed repeatedly at a bent portion 259 thereof, the bent portion 259 should not be curved sharply. The fixing plate 254 has a rounded inner end 280 which is somewhat receding from the bent portion 259 of the diaphragm 252 to make sure that the diaphragm 252 subjected to repeated deformation is not abraded by the inner end 280.

Figure 14:
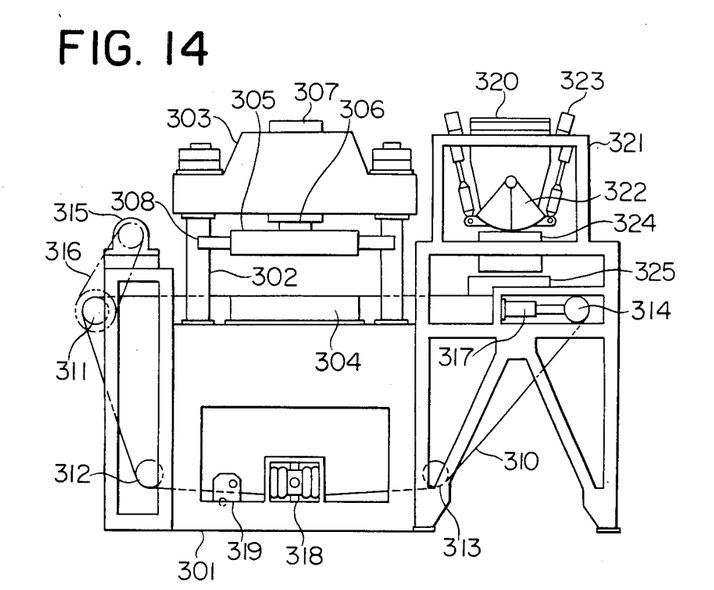
FIG. 14 is a schematic view showing the overall structure of the dewatering apparatus according to a still further embodiment of the present invention.

FIG. 14 shows a dewatering apparatus according to a further embodiment of the present invention. This dewatering apparatus comprises a lower frame 301, four vertical guide rods 302 projecting from the lower frame 301, and an upper frame 303 secured to the four guide rods 302. A filtration plate 304 is mounted on the top surface of the lower frame 301, and a compression plate 305 is connected to a piston rod 306 of a hydraulic cylinder 307 which is supported by the upper frame 303. With four guides 308, the compression plate 305 is vertically slidable along the four guide rods 302. A filter cloth 310 runs endlessly around pulleys 311, 312, 313, 314 mounted on the lower frame 301 and is moved by a motor 315 which drives the pulley 311 via a chain 316. The filter cloth 310 is adapted to slide over the top surface of the filtration plate 304 while tensioned by a cylinder 317 pushing the pulley 314 rightwardly. The filter cloth 310 also runs through a meander prevention means 318 to make sure that the filter cloth 310 is always straight over its entire length. A washing means 319 is mounted on the lower frame 301 for washing the filter cloth 310.

A sludge hopper 320 mounted on a right frame 321 has a hopper gate 322 which is opened by electric cylinders 323. Mounted on the frame 321 beneath the hopper gate 322 is a chute 324, and a sludge feeder 325 is fixed to the frame 321 below the chute 324 and is slidably contacting with the filter cloth 310.

Figure 15:
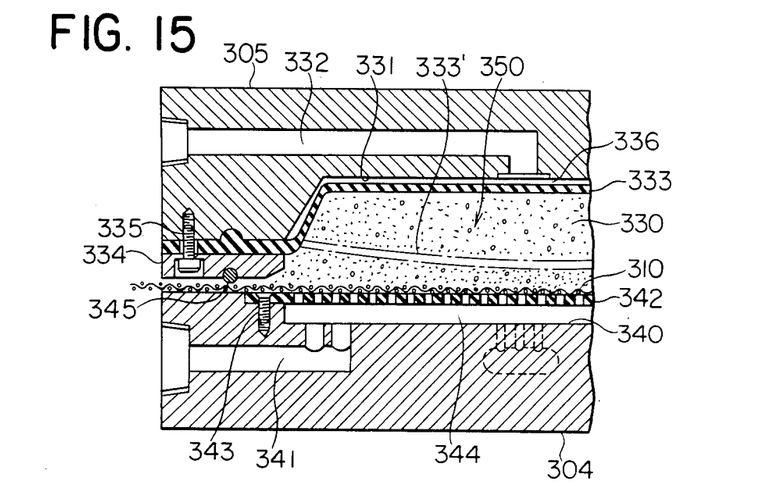
FIG. 15 is an enlarged, cross-sectional view of an essential portion of the dewatering apparatus of FIG. 14.

This dewatering apparatus is a lateral type. Conditioned sludge pieces are fed onto the filter cloth 310 from the hopper 320 through the chute 324 and conveyed to a position just on the filtration plate 304 onto which the compression plate 305 is moved down by the hydraulic cylinder 307. The details of the conditioned sludge pieces 330 being compressed between the compression plate 303 and the filtration plate 304 are shown in FIG. 15. Essentially similar to the dewatering apparatus as shown in FIG. 6, the compression plate 305 has a recess 331, a path 332 extending in the compression plate 305 and opening to the recess 331, an elastic diaphragm 333 received in the recess 331 and secured to the compression plate 305 with an annular fixing plate 334 and a number of screws 335. The filtration plate 304 is provided with a recess 340, a number of paths 341 communicating with the recess 340, and a porous support member 342 secured to the filtration plate 304 with a number of screws 343 over the recess 340, thus defining a filtrate chamber 344. The filter cloth 310 overlies the porous support member 342, and sealed in a fluid-tight manner with an annular seal member 345. Contained in a cavity 350 defined by the diaphragm 333 and the filter cloth 310, the conditioned sludge pieces 330 are compressed uniformly by the diaphragm 333 which is evenly pushed by a pressure fluid fed into a fluid chamber 336 through the path 332. The manner of compressing the sludge pieces is essentially the same as in FIG. 6. As being compressed, the water squeezed out of the sludge pieces 330 is withdrawn through the filter cloth 310 and the porous support plate 342. A pressurized air is also effective for accelerating the withdrawal of the water extracted from the sludge. Phantom lines 333' in FIG. 15 shows the diaphragm after completion of the compression operation.

After completion of the compression of the sludge pieces, the compression plate 305 is elevated, and the filter cloth 310 is driven to convey and dump the thus dewatered sludge onto a predetermined means (not shown). The filter cloth 310 is then washed by the washing means 319, and the same operation is repeated.

The present invention will be explained in further detail by the following Example.

EXAMPLE

With the dewatering apparatus as shown in FIG. 6, the primary dewatered sludge pieces (average size: about 8 mm, water content: 75%) conditioned with 15% incineration ashes on a wet basis was isostatically compressed. The diameter of a diaphragm used was 35 cm and the thickness of a cavity defined by the diaphragm and the filter cloth was 9 cm. Initial compression was carried out at 20 kg/cm$^2$ for 60 seconds and then second compression was carried out at 50 kg/cm$^2$ for 60 seconds. The resulting secondary dewatered sludge was measured with respect to its water content distribution. As a result, the water content of the secondary dewatered sludge was 43.3% for a middle portion, 40.3% for an upper portion, 44.3% for a lower portion and 43.8% and 44.3% for both side portions The same dewatering operation was repeated on the same primary dewatered sludge pieces using the press C as shown in FIG. 16. This press had an inner diameter of 14 cm and a height of 9 cm. As a result, the water content of the resulting secondary dewatered sludge was 42.6% for a middle portion, and 50.8%, 51.6%, 47.4% and 49.9% for four side portions.

The comparison of the above data clearly shows that the isostatic compression of the primary dewatered sludge conditioned with dewatering powders by the dewatering apparatus of the present invention provides a lower water content as a whole.

With the features of the present invention as described above, the conditioned sludge pieces can be compressed to dewater without substantially destroying fine water paths, namely capillaries thereof. Since compression of the conditioned sludge pieces is performed isostatically, namely uniformly by the diaphragm of the dewatering apparatus according to the present invention, uneven compression can be effectively avoided, resulting in as low water content as less than 50%, and even 30% water content can be achieved as long as suitable conditions are selected. Further, the isostatic compression system according to the present invention leads to a higher dewatering capacity for the same size and weight of a dewatering apparatus, which means that a higher dewatering efficiency can be achieved by the dewatering apparatus of the present invention.

The present invention has been explained by the preferred embodiments referring to the attached drawings, but it should be noted that it is not restricted thereto and that any modification can be made unless it deviates from the scope of the present invention defined by the claims attached hereto. For instance, in the embodiments described above, only the compression plates are moved vertically, but it is also possible that the filtration plates are moved vertically while the compression plates are stationary. Therefore, what is important is that either one of the compression plate and the filtration plate is moved vertically to provide a gap through which the conditioned sludge pieces are fed into the cavity defined by the diaphragm and the filter member.

What is claimed is:

1. An apparatus for dewatering primary dewatered sludge pieces having an inner capillary structure and conditioned with dewatering powders, the apparatus comprising:
    (a) a first member having a recess and a path communicating with said recess;
    (b) a fluid-tight diaphragm mounted over said recess thereby defining a fluid chamber with which said path communicates;
    (c) a second member having a filtrate chamber;
    (d) a filter member provided over said filtrate chamber;
    (e) means for moving at least one of said first member and said second member laterally to bring them into fluid-tight contact with each other;
    (f) means for moving one of said first member and said second member vertically to open a cavity defined by said diaphragm and said filter member;
    (g) means provided above said cavity for introducing said primary dewatered sludge pieces into said cavity by gravity; and
    (h) means connected to said path of said first member for feeding a pressure fluid to said fluid chamber, thereby isostatically compressing said primary dewatered sludge pieces remove the water contained therein without substantially destroying the inner capillary structure of said primary dewatered sludge pieces.

2. The dewatering apparatus according to claim 1, wherein said filter member comprises a filter cloth and a porous support plate.

3. The dewatering apparatus according to claim 1, further comprising means for conducting pressurized air through said filtrate chamber to entrain the water squeezed out of said sludge pieces and emerging from said filter member.

4. The dewatering apparatus according to claim 1, comprising a plurality of said first members and a plurality of said second members arranged alternately.

5. The dewatering apparatus according to claim 4, wherein said vertically moving means are said first members.

6. The dewatering apparatus according to claim 5, further comprising a first guide rod along which said first members and said second members are slidable horizontally and from which said first members are detachable upwardly, and a second guide rod with which only said first members are slidably engaged, said second guide rod being movable vertically thereby causing said first members to move up and down between their high and low positions.

7. The dewatering apparatus according to claim 6, further comprising at least one means for moving said second guide rod up and down.

8. The dewatering apparatus according to claim 7, wherein said second guide rod-moving means comprises a vertical cylinder having a piston rod connected to said second guide rod and driven by a motor.

9. The dewatering apparatus according to claim 7, wherein said second guide rod-moving means comprises at least one chain endlessly provided around upper and lower pulleys in such a manner that said first members can move up and down along with said chain.

10. The dewatering apparatus according to claim 5 further comprising a stationary guide frame along which said second members are slidable horizontally, and a guide rail means movable vertically and along which said first members are slidable horizontally, whereby said cavity is open to said sludge piece-introducing means when said first members are at their high position, and said primary dewatered sludge pieces contained in said cavity are compressed isostatically by said diaphragm when said first members are at their low position.

11. The dewatering apparatus according to claim 10, wherein said means for moving at least one of said first member and said second member is composed of a main hydraulic cylinder and an auxiliary hydraulic cylinder, said main hydraulic cylinder serving to close a gap between said first member and said second member fluid-tightly, and said auxiliary cylinder serving to move at least one of said first member and said second member relatively fast.

12. The dewatering apparatus according to claim 10, further comprising at least one means for moving said guide rail means vertically.

13. The dewatering apparatus according to claim 12, wherein said means for moving said guide rail means is a link system composed of links connected to said guide rail means and means for driving said links.

14. The dewatering apparatus according to claim 1, wherein said pressure fluid feeding means includes means for feeding said pressure fluid to said path in two steps, first at relatively low pressure and second at relatively high pressure.

15. The dewatering apparatus according to claim 14, wherein said two step feeding means includes means to intain said relatively low pressure at 10–25 kg/cm$^2$ and said relatively high pressure at 30–70 kg/cm$^2$.

* * * * *